United States Patent
Kuroda et al.

[11] Patent Number: 6,134,098
[45] Date of Patent: Oct. 17, 2000

[54] HIGH VOLTAGE MULTILAYER CAPACITOR

[75] Inventors: Yoichi Kuroda, Fukui; Chiharu Chikashige, Izumo, both of Japan

[73] Assignee: Murata Manufacturing Co., Ltd., Japan

[21] Appl. No.: 09/243,847

[22] Filed: Feb. 3, 1999

[30] Foreign Application Priority Data

Feb. 6, 1998 [JP] Japan .................................. 10-025942

[51] Int. Cl.[7] .............................. H01G 4/06; H01G 4/005
[52] U.S. Cl. ....................... 361/321.2; 361/303; 29/25.42
[58] Field of Search ................................ 361/303, 306.1, 361/306.3, 309, 310, 311–313, 321.2; 29/25.42

[56] References Cited

U.S. PATENT DOCUMENTS

| | | | |
|---|---|---|---|
| 3,617,834 | 11/1971 | Rayburn ................................ | 361/321.2 |
| 4,556,929 | 12/1985 | Tanaka et al. ....................... | 361/321.2 |
| 6,034,864 | 5/2000 | Naito et al. .......................... | 361/306.1 |

FOREIGN PATENT DOCUMENTS

| | | |
|---|---|---|
| 0866478 | 9/1998 | European Pat. Off. . |
| 58-56431 | 4/1983 | Japan . |
| 60-76028 | 5/1985 | Japan . |
| 62-120333 | 7/1987 | Japan . |
| 62-210612 | 9/1987 | Japan . |

OTHER PUBLICATIONS

WPI Abstract Accession No. 98–222774 & JP 10064703A (Sumitomo), Mar. 6, 1998.
WPI Abstract Accession No. 96–29301 & JP 8124799A (Rohm), May 17, 1996.

*Primary Examiner*—Kristine Kincaid
*Assistant Examiner*—Anthony Dinkins
*Attorney, Agent, or Firm*—Ostrolenk, Faber, Gerb & Soffen, LLP

[57] ABSTRACT

A high-voltage multilayer capacitor include a plurality of takeout portions which are connected in series between the first and second opposite end surfaces of a ceramic sintered compact, and internal electrodes formed between the first and second end surfaces to form at least four capacity takeout portions which are connected in series. Low-dielectric-constant layers having a relatively low dielectric constant are provided on the upper and lower sides of the portion comprising the plurality of internal electrodes. Furthermore, in the internal electrodes opposite to the first and second internal electrodes, which are respectively drawn out of the first and second end surfaces, in the thickness direction thereof, the corners on the sides of the internal electrodes opposite to the first and second internal electrodes are rounded.

7 Claims, 2 Drawing Sheets

HIGH VOLTAGE MULTILAYER CAPACITOR

BACKGROUND OF THE INVENTION

1. Field of the Invention

The present invention relates to a high-voltage multilayer capacitor suitable for use in which a high voltage such as, for example, AC 250 V or DC 500 V, is applied, and particularly to a high-voltage multilayer capacitor in which a ceramic sintered compact and an internal electrode are modified for improving voltage resistance and preventing undesirable flashover.

2. Description of the Related Art

A capacitor used in applications in which a high voltage is applied is strongly demanded to have high voltage resistance, and suppress flashover in the outer surfaces thereof.

Therefore, as a multilayer capacitor which withstands a high voltage, capacitors having various structures have previously been proposed (for example, Japanese Unexamined Utility Model Publication Nos. 60-76028, 62-120333 and 58-56431, and Japanese Unexamined Patent Publication No. 62-210612).

FIGS. 3 and 4 are a sectional front view and a sectional plan view, respectively, illustrating an example of conventional high-voltage multilayer capacitors.

Referring FIGS. 3 and 4, a multilayer capacitor 31 comprises a ceramic sintered compact 32 composed of dielectric ceramics. The ceramic sintered compact 32 has a first external electrode 33 formed on the end surface 32a, and a second external electrode 34 formed on the end surface 32b. Although a capacity can be taken out through the first and second external electrodes 33 and 34, a plurality of capacity takeout portions are provided in the ceramic sintered compact 32 so as to be connected in series in the direction from the first end surface 32a to the second end surface 32b.

Namely, first internal electrodes 35a to 35c are formed at different heights so as to be drawn out of the end surface 32a. Also second internal electrodes 36a, 36b and 36c are formed at different heights so as to be drawn out of the end surface 32b. In addition, unconnected internal electrodes 37a to 37c, 38a to 38c, and 39a to 39c are formed between the first and second internal electrodes 35a and 36a, between the second internal electrodes 35b and 36b, and between the first and second internal electrodes 35c and 36c, respectively.

For these internal electrodes, unconnected internal electrodes 40a to 40d, and 41a to 41d are formed to be overlapped with the adjacent internal electrodes through the ceramic layers in the thickness direction.

Therefore, in the above-described internal electrode structure, structures each comprising eight capacity takeout portions, which are connected in series in the direction from the end surface 32a to the end surface 32b, are connected in parallel between the first and second external electrodes 33 and 34.

Namely, the multilayer capacitor 31 has a structure in which eight capacity takeout portions are connected in series, as described above, so that the voltage resistance is improved.

On the other hand, Japanese Unexamined Patent Publication No. 62-210612 discloses a multilayer capacitor having a structure in which ceramic layers having a relatively low dielectric constant are arranged above and below capacity takeout portions comprising internal electrodes, thereby suppressing flashover in the upper and lower sides of a sintered compact.

However, in the above-mentioned multilayer capacitor 31, the plurality of capacity takeout portions are arranged in series between the first and second external electrodes 33 and 34 to increase voltage resistance, but flashover in the surfaces of the ceramic sintered compact 32 cannot be prevented.

On the other hand, in the multilayer capacitor disclosed in Japanese Unexamined Patent Publication No. 62-210612, the layers having a relatively low dielectric constant are arranged on the upper and lower sides of the portion comprising internal electrodes to suppress flashover in the upper and lower sides of the ceramic sintered compact, as described above, but flashover in the side of the ceramic sintered compact cannot be effectively suppressed. In addition, since the layers having a low dielectric constant are simply provided, voltage resistance cannot be improved.

SUMMARY OF THE INVENTION

Accordingly, it is an object of the present invention to solve the above problems of the conventional techniques and provide a multilayer capacitor with excellent voltage resistance which is capable of securely preventing flashover in the external surfaces, and which is suitable for high-voltage applications.

In accordance with an embodiment of the present invention, there is provided a high-voltage multilayer capacitor comprising a ceramic sintered compact having first and second end surfaces, which are opposite to each other; first and second internal electrodes arranged in the ceramic sintered compact to be drawn out of the first and second end surfaces, respectively; a plurality of third internal electrodes arranged between the first and second internal electrodes to form a plurality of capacity takeout portions, which are connected in series in the direction from the first internal electrode to the second internal electrode; and first and second external electrodes formed on the first and second end surfaces to be connected to the first and second internal electrodes, respectively. The plurality of third internal electrodes are arranged between the first and second internal electrodes to form at least four capacity takeout portions which are connected in series. Low-dielectric-constant layers comprising ceramic having a lower relative dielectric constant than the portion comprising the first to third internal electrodes are formed on the upper and lower sides of the portion comprising the first to third internal electrodes of the ceramic sintered compact. Of the third internal electrodes, the corners on the sides of the internal electrodes, which are opposite to the first and second internal electrodes in the direction of a line connecting the first and second end surfaces, are rounded.

A plurality of structures each comprising the at least four capacity takeout portions formed by the first to third internal electrodes and connected in series are formed in the ceramic sintered compact in the thickness direction thereof.

The low-dielectric-constant layers are arranged in the outermost layers in the vertical direction of the ceramic sintered compact.

The plurality of third internal electrodes comprise a plurality of first unconnected internal electrodes, which are spaced in the direction of a line connecting the first and second end surfaces, at the same height as the first and second internal electrodes, and a plurality of second unconnected internal electrodes which are arranged to be overlapped with the adjacent internal electrodes of the first internal electrode, the plurality of first non-connection internal electrodes, and the second internal electrode, through the ceramic sintered compact layer.

DESCRIPTION OF THE PREFERRED EMBODIMENT

The present invention will be described in detail below with reference to an indefinite embodiment of the present invention.

Figure 1:
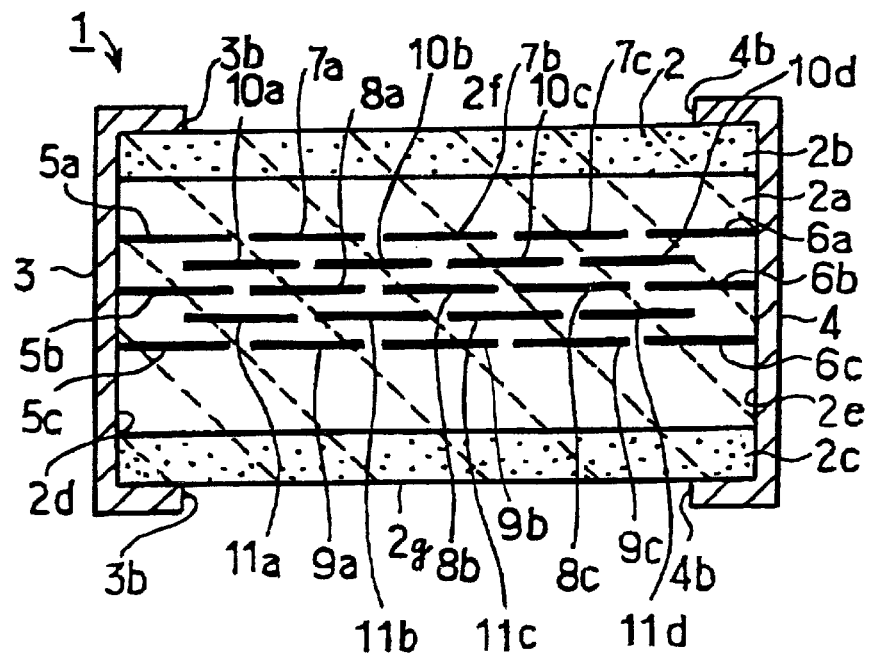
FIG. 1 is a sectional front view showing a high-voltage multilayer capacitor in accordance with an embodiment of the present invention.
Figure 2:
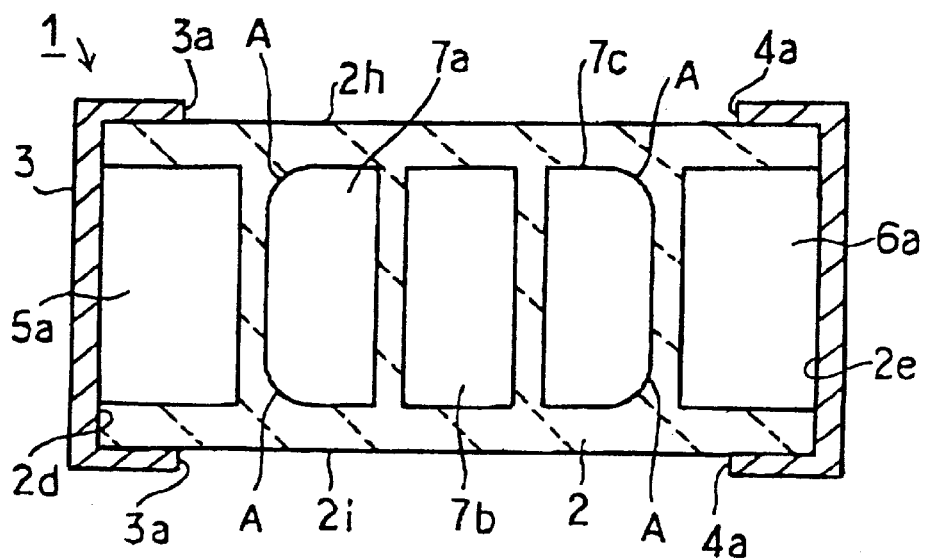
FIG. 2 is a sectional plan view of the high-voltage multilayer capacitor shown in FIG. 1.
Figure 3:
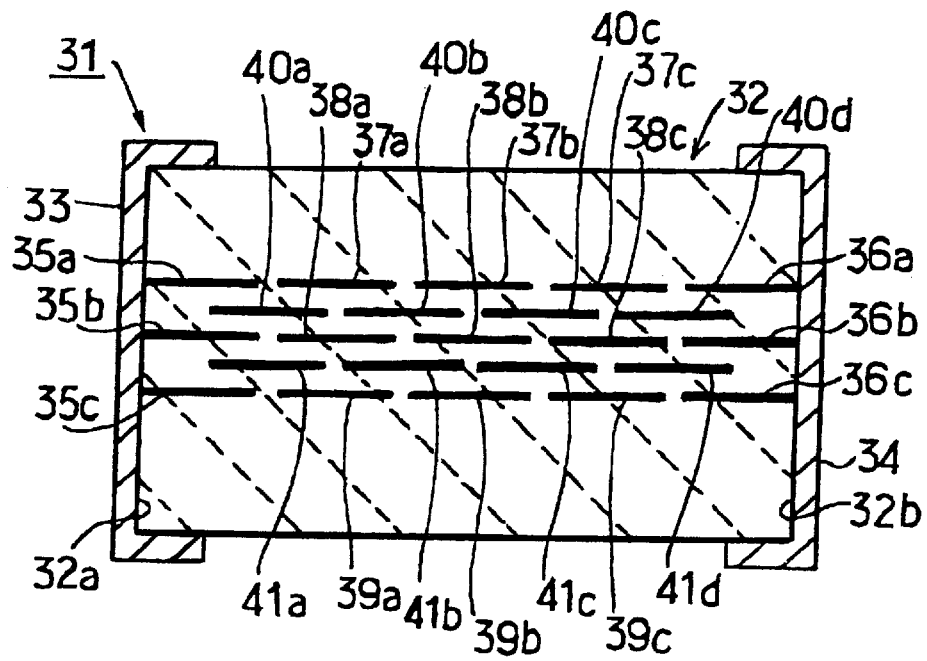
FIG. 3 is a sectional front view showing an example of conventional high-voltage multilayer capacitors.
Figure 4:
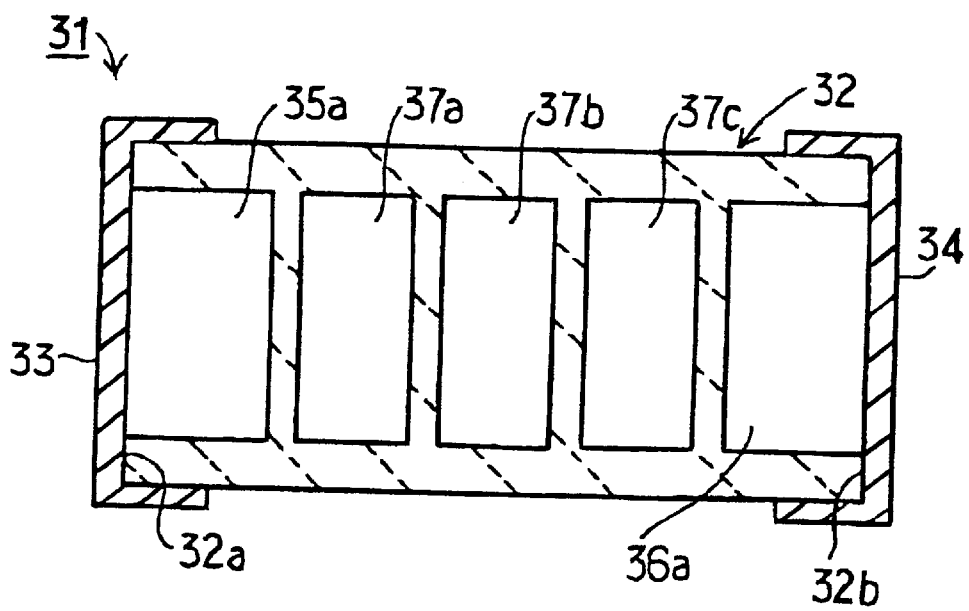
FIG. 4 is a sectional plan view of the high-voltage multilayer capacitor shown in FIG. 3.

FIG. 1 is a sectional front view showing a high-voltage multilayer capacitor in accordance with an embodiment of the present invention, and FIG. 2 is a sectional plan view thereof.

A multilayer capacitor 1 comprises a ceramic sintered compact 2 having the shape of a rectangular parallelopiped. The ceramic sintered compact 2 is made of an appropriate dielectric ceramic, and comprises low-dielectric-constant layers 2b and 2c which have a lower relative dielectric constant than that of the central portion 2a, and which are formed in the outermost layers, i.e., in the uppermost and lowermost portions of the ceramic centered compact.

In the multilayer ceramic integral sintering technique for obtaining the ceramic sintered compact 2, which will be described below, the central portion 2a and the low-dielectric-constant layers 2b and 2c can be formed by using a ceramic green sheet composed of a ceramic powder having a relatively high relative dielectric constant for forming the central portion 2a, and using a ceramic green sheet composed of a ceramic powder having a relatively low relative dielectric constant for forming the low-dielectric-constant layers 2b and 2c.

The ceramic sintered compact 2 has first and second end surfaces 2d and 2e, which are opposite to each other. A first external electrode 3 is formed to cover the end surface 2d and extend to the upper and lower sides 2f and 2g, and the sides 2h and 2i of the ceramic sintered compact 2. Similarly, a second external electrode 4 is formed to cover the end surface 2e and extent to the upper and lower sides 2f and 2g, and the sides 2h and 2i.

The first and second external electrodes 3 and 4 are formed by coating conductive paste such as Ag—Pd, Ag, or Cu paste on the ceramic sintered compact 2, and then baking the paste. Of course, the external electrodes 3 and 4 may be formed by a thin film forming method, for example, such as vapor deposition, plating, sputtering, or the like.

In the ceramic sintered compact 2 are arranged a plurality of internal electrodes to form eight capacity takeout portions which are connected in series between the external electrodes 3 and 4.

In this internal electrode structure, first internal electrodes 5a, 5b and 5c are formed at different heights to be drawn out of the first end surface 2d. Also second internal electrodes 6a, 6b and 6c are formed at different heights to be drawn out of the second end surface 2e.

The first internal electrode 5a and the second internal electrode 6a are arranged on the same plane. This is true for the first internal electrode 5b and the second internal electrode 6b, and the first internal electrode 5c and the second internal electrode 6c.

At the height where the first and second internal electrodes 5a and 6a are formed, first unconnected internal electrodes 7a, 7b and 7c are arranged between the first and second internal electrodes 5a and 6a. Similarly, at the height where the first and second internal electrodes 5b and 6b are formed, first unconnected internal electrodes 8a, 8b and 8c are arranged between the first and second internal electrodes 5b and 6b. Also first unconnected internal electrodes 9a, 9b and 9c are arranged between the first and second internal electrodes 5c and 6c.

Furthermore, second unconnected internal electrodes 10a to 10d are arranged at a height between the height of the first and second internal electrodes 5a and 6a, and the unconnected internal electrodes 7a to 7c, and the height of the first and second internal electrodes 5b and 6b, and the unconnected internal electrodes 8a to 8c. The second unconnected internal electrodes 10a to 10d are arranged to be overlapped, through the ceramic layer, with the adjacent electrodes of the first internal electrode 5a, the first unconnected internal electrodes 7a to 7c, and the second internal electrode 6a.

The unconnected internal electrode 10a is described as an example. The unconnected internal electrode 10a is arranged so as to be overlapped with the first internal electrode 5a and the unconnected internal electrode 7a with the ceramic layer therebetween. Similarly, the unconnected internal electrode 10b is arranged so as to be overlapped with the unconnected internal electrodes 7a and 7b with the ceramic layer therebetween. Therefore, between the first and second internal electrodes 5a and 6a, capacity takeout portions are respectively formed between the first internal electrode 5a and the unconnected internal electrode 10a, between the unconnected internal electrodes 10a and 7a, between the unconnected internal electrodes 7a and 10b, between the unconnected internal electrodes 10b and 7b, between the unconnected internal electrodes 7b and 10c, between the unconnected internal electrodes 10c and 7c, between the unconnected internal electrodes 7c and 10d, and between the unconnected internal electrode 10d and the second internal electrode 6a. Namely, the eight capacity takeout portions are connected in series between the first and second internal electrodes 5a and 6a.

Similarly, the second unconnected internal electrodes 10a to 10d are arranged in the same positional relationship to the first internal electrode 5b, the first unconnected internal electrodes 8a to 8d and the second internal electrode 6b as described above, to form eight capacity takeout portions.

Also second unconnected internal electrodes 11a to 11d are arranged at a height between the height of the first and second internal electrodes 5b and 6b, and the first unconnected internal electrodes 8a to 8c, and the height of the first and second internal electrodes 5c and 6c, and the first unconnected internal electrodes 9a to 9c. Like the unconnected internal electrodes 10a to 10d, the second unconnected internal electrodes 11a to 11d are also arranged to form eight capacity takeout portions, which are connected in series, between the first and second internal electrodes 5b and 6b and the first unconnected internal electrodes 8a to 8c, and eight capacity takeout portions, which are connected in series, between the first and second internal electrodes 5c and 6c and the first unconnected internal electrodes 9a to 9c.

Therefore, structures each comprising the eight capacity takeout portions, which are connected in series, are connected in parallel between the first and second external electrodes 3 and 4, thereby effectively improving voltage resistance.

In the present invention, at least four capacity takeout portions are preferably formed to be connected in series, as described above, for effectively improving voltage resistance.

The material for forming the internal electrodes 5a to 11d is not limited, and an appropriate metal or alloy such as Ag, Ag—Pd, Cu, Ni, or the like can be used.

In this embodiment, the plurality of capacity takeout portions are connected in series to improve the voltage resistance. In addition, the low-dielectric-constant layers 2b and 2c are provided, and the shape of the unconnected internal electrodes 7a, 7c, 8a, 8c, 9a, and 9a is modified to effectively suppress flashover.

Namely, flashover in the outer surfaces of the ceramic sintered compact 2 is a phenomenon which occurs due to discharge between electrodes connected to different potentials. Flashover causes cracks in the outer surfaces of the ceramic sintered compact 2, thereby deteriorating characteristics, and in extreme cases, causing breakage of an element.

Flashover in the sides 2h and 2i of the ceramic sintered compact 2 mainly occurs between the ends 3a and 4a of the external electrodes 3 and 4, which are positioned on the sides 2h and 2i, and the internal electrodes 7a, 7c, 9a, and 9c, which are closest to the ends 3a and 4a and connected to different potentials.

In the multilayer capacitor 1 of this embodiment, in the unconnected internal electrodes 7a and 7c, i.e., the unconnected internal electrodes 7a and 7c opposite to the first and second internal electrodes 5a and 6a, respectively, in the direction of a line connecting the end surfaces 2d and 2e, the corners on the sides thereof which are respectively opposite to the first and second internal electrodes are rounded in order to suppress the flashover, as shown by an arrow A in FIG. 2. Therefore, by forming the rounded portions A, the distances between the internal electrodes 7a and 7c and the ends 3a and 4a of the external electrodes 3 and 4, which are positioned on the sides 2h and 2i of the ceramic sintered compact 2, are increased, thereby ameliorating concentration of an electric field between the internal electrodes 7a and 7c and the ends 3a and 4a, and effectively suppressing flashover.

Although not shown in the drawings, in the unconnected internal electrodes 8a, 8c, 9a, and 9c, the corners on the sides respectively opposite to the first and second internal electrodes 5b, 5c, 6b, and 6c are also rounded to effectively suppress flashover in the sides 2h and 2i of the ceramic sintered compact 2.

In the multilayer capacitor 1, since the low-dielectric-constant layers 2b and 2c are provided, it is possible to suppress flashover in the upper and lower sides 2f and 2g of the ceramic sintered compact 2. Namely, flashover in the upper and lower sides 2f and 2g of the ceramic sintered compact 2 occurs between the ends 3b and 4b of the external electrodes 3 and 4, which are positioned on the upper and lower sides 2f and 2g, and the unconnected internal electrodes 7a, 7c, 9a, and 9c.

However, in this embodiment, since the low-dielectric-constant layers 2b and 2c are provided between the ends 3b and 4b and the unconnected internal electrodes 7a, 7c, 9a and 9c, concentration of an electric field is ameliorated, for example, between the ends 3b of the external electrode 3 and the unconnected internal electrodes 7a and 9a, thereby effectively suppressing flashover in the upper and lower sides 2f and 2g of the sintered compact 2. Similarly, since the low-dielectric-constant layers 2b and 2c are respectively provided between the ends 4b of the external electrode 4 and the unconnected internal electrodes 7c and 9c, concentration of an electric field is ameliorated, thereby effectively suppressing flashover in the upper and lower sides 2f and 2g of the sintered compact 2.

Therefore, in the multilayer capacitor 1 of this embodiment, by forming the rounded portions A at the corners of the unconnected internal electrodes 7a, 7c, 8a, 8c, 9a, and 9c, it is possible to suppress flashover in the sides 2h and 2i of the ceramic sintered compact 2. In addition, the arrangement of the low-dielectric-constant layers 2b and 2c suppresses flashover in the upper and lower sides.

Description will now be made of the multilayer capacitor 1 with respect to an increase in voltage resistance and a decrease in flashover, based on experimental examples.

A rectangular ceramic green sheet was formed by using a slurry composed of $BaTiO_3$ powder having a relatively high dielectric constant, and the above-described internal electrode pattern was formed on the ceramic green sheet. A plurality of such ceramic green sheets were laminated, and a plurality of the same ceramic green sheets without an electrode pattern were laminated on the upper and lower sides of the resultant laminate. A rectangular ceramic green sheet formed by using a slurry composed of $SrTiO_3$ powder having a relatively low dielectric constant was further laminated on each of the upper and lower sides, followed by pressing in the thickness direction to obtain a laminate. The thus-obtained laminate was sintered to obtain the ceramic sintered compact 2 shown in FIG. 1. The thus-obtained ceramic sintered compact 2 had dimensions of 5.7 mm (L)×5.0 mm (W)×1.8 mm (T), and the central portion 2a had a relative dielectric constant of 2300, and the low-dielectric-constant layers 2b and 2c had a relative dielectric constant of 300. The low-dielectric-constant layers 2b and 2c had a thickness of 100 μm, and the central portion 2a had a thickness of 1.6 mm (however, the thickness of the multilayer electrode portion was 1.2 mm).

Then, Ag paste was coated on the end surfaces 2d and 2e of the thus-obtained ceramic sintered compact 2, and then baked to form the external electrodes 3 and 4, to obtain the multilayer capacitor 1 as an example.

For comparison, a multilayer capacitor was formed as Comparative Example 1 by the same method as the above except that the low-dielectric-constant layers 2b and 2c were not formed, and the corners of the unconnected internal electrodes 7a, 7c, 8a, 8c, 9a and 9c were not rounded.

Furthermore, a multilayer capacitor was formed as Comparative Example 2 by the same method as the above except that the corners of the unconnected internal electrodes 7a, 7c, 8a, 8c, 9a and 9c were not rounded.

For the multilayer capacitors of the example and Comparative Examples 1 and 2, the AC breakdown voltage was measured by an AC-BDV test in each of air and silicon oil. The results of measurement are shown in Table 1 below together with variations $X_{3CV}$ in breakdown voltage in measurement of 20 tests.

Table 1 below also shows the incidence of flashover of each of the multilayer capacitors.

TABLE 1

| | Atmosphere | Breakdown voltage (kV$_{AC}$) | Variation X$_{3CV}$ (%) | Incidence of flashover (%) | Remarks |
|---|---|---|---|---|---|
| Example | In air | 4.5 | 14 | 0 | No flashover |
| Comp. Example 1 | In air | 2.5 | 30 | 100 | Flashover in the upper and lower sides |
| | In oil | 4.5 | 15 | 0 | No flashover |
| Comp. Example 2 | In air | 3.3 | 20 | 100 | Flashover in the side |

Table 1 indicates that in the multilayer capacitor of Comparative Example 1, the breakdown voltage in air is 2.5 kV$_{AC}$, the breakdown voltage in silicon oil is 4.5 kV$_{AC}$, and the incidence of flashover in air is 100%, while in Comparative Example 2, the breakdown voltage in air is increased to 3.3 kV$_{AC}$, and the variation X$_{3CV}$ is also decreased to 20%. This is possibly due to the low-dielectric-constant layers provided in Comparative Example 2. However, even in Comparative Example 2, the incidence of flashover is 100%.

On the other hand, in the multilayer capacitor of the example, the breakdown voltage in air is as high as 4.5 kV$_{AC}$, and the variation X$_{3CV}$ is also decreased to 14%. In addition, flashover did not occur in air.

As described above, a plurality of third internal electrodes are arranged between the first and second internal electrodes to form at least four capacity takeout portions which are connected in series, thereby effectively improving the voltage resistance. Also the low-dielectric-constant layers having a low relative dielectric constant are formed on the upper and lower sides of the portion comprising the first to third internal electrodes, thereby effectively suppressing flashover in the upper and lower sides of the ceramic sintered compact. Furthermore, in the third internal electrodes opposite to the first and second internal electrodes in the direction of a line connecting the first and second end surfaces, the corners on the sides opposite to the first and second internal electrodes are rounded, thereby securely suppressing flashover in both sides of the sintered compact.

Therefore, it is possible to provide a high-voltage multilayer capacitor suitable for high-voltage applications, and having excellent reliability.

In the present invention, a plurality of structures each comprising at least four capacity takeout portions formed by the first to third internal electrodes and connected in series are formed in the ceramic sintered compact in the thickness direction thereof. It is thus possible to provide a high-voltage multilayer capacitor having excellent voltage resistance and causing less flashover.

Since the low-dielectric-constant layers are arranged in the outermost layers in the vertical direction of the ceramic sintered compact, it is possible to securely prevent flashover in the upper and lower sides of the ceramic sintered compact.

Furthermore, the first unconnected internal electrodes are arranged at the same height as the first and second internal electrodes, and the second unconnected internal electrodes are arranged so as to be overlapped, through a ceramic sintered layer, with the adjacent electrodes of the first internal electrode, the plurality of first unconnected internal electrodes, and the second internal electrode. Therefore, in producing a multilayer capacitor by using the multilayer ceramic integral sintering technique using ceramic green sheets, the first and second internal electrodes and the first unconnected internal electrodes can be formed on the same ceramic green sheet, thereby simplifying the production process.

What is claimed is:

1. A high-voltage multilayer capacitor comprising:

a ceramic sintered compact having first and second end surfaces which are opposite to each other, the compact also having a top portion, a central portion and a lower portion, the top and lower portions having a dielectric constant which is lower than that of the central portion;

first and second internal electrodes arranged in the central portion of the ceramic sintered compact to be drawn out at the first and second end surfaces, respectively;

a plurality of third internal electrodes arranged in the central portion of the ceramic sintered compact between the first and second internal electrodes to form a plurality of capacity takeout portions which are connected in series in the direction from the first internal electrode to the second internal electrode;

first and second external electrodes respectively formed on the first and second end surfaces and connected to the first and second internal electrodes; and wherein the plurality of third internal electrodes are arranged between the first and second internal electrodes to form at least four capacity takeout portions which are connected in series; and the corners of the side of the third internal electrodes which face the first and second internal electrodes are rounded.

2. A high-voltage multilayer capacitor according to claim 1, wherein the first, second and third internal electrodes together form a series connected capactive structure formed between the first and second external electrodes and wherein a plurality of such capacitive structures are formed in the central portion of the ceramic sintered compact.

3. A high-voltage multilayer capacitor according to claim 1, wherein the low-dielectric-constant layers are in arranged in the outermost layers in the vertical direction of the ceramic sintered compact.

4. A high-voltage multilayer capacitor according to claim 1, wherein the plurality of third internal electrodes comprise a plurality of first unconnected internal electrodes spaced in the direction of a line connecting the first and second end surfaces, at the same height as the first and second internal electrodes, and a plurality of second unconnected internal electrodes arranged to be overlapped, through a ceramic sintered compact layer, with the adjacent electrodes of the first internal electrode, the plurality of first unconnected internal electrodes, and the second internal electrode.

5. A high-voltage multilayer capacitor according to claim 2, wherein the low-dielectric-constant layers are in arranged in the outermost layers in the vertical direction of the ceramic sintered compact.

6. A high-voltage multilayer capacitor according to claim 2, wherein the plurality of third internal electrodes comprise a plurality of first unconnected internal electrodes spaced in the direction of a line connecting the first and second end surfaces, at the same height as the first and second internal electrodes, and a plurality of second unconnected internal electrodes arranged to be overlapped, through a ceramic sintered compact layer, with the adjacent electrodes of the first internal electrode, the plurality of first unconnected internal electrodes, and the second internal electrode.

7. A high-voltage multilayer capacitor according to claim 3, wherein the plurality of third internal electrodes comprise a plurality of first unconnected internal electrodes spaced in the direction of a line connecting the first and second end surfaces, at the same height as the first and second internal electrodes, and a plurality of second unconnected internal electrodes arranged to be overlapped, through a ceramic sintered compact layer, with the adjacent electrodes of the first internal electrode, the plurality of first unconnected internal electrodes, and the second internal electrode.

* * * * *